United States Patent [19]
Kimura et al.

[11] Patent Number: 5,415,851
[45] Date of Patent: May 16, 1995

[54] METHOD FOR THE PREPARATION OF SPHERICAL PARTICLES OF A RARE EARTH PHOSPHATE

[75] Inventors: Yuji Kimura; Shigeru Sakai; Norifumi Yoshida, all of Fukui, Japan

[73] Assignee: Shin-Etsu Chemical Co., Ltd., Tokyo, Japan

[21] Appl. No.: 199,729

[22] Filed: Feb. 22, 1994

[30] Foreign Application Priority Data

Feb. 22, 1993 [JP] Japan .................................. 5-056429

[51] Int. Cl.$^6$ ...................... C09K 11/08; C01F 17/00
[52] U.S. Cl. ............................. 423/263; 252/301.4 P
[58] Field of Search ................. 423/263; 252/301.4 P

[56] References Cited

U.S. PATENT DOCUMENTS

| | | | |
|---|---|---|---|
| 5,091,110 | 2/1992 | Fan et al. | 252/301.4 P |
| 5,314,641 | 5/1994 | Collin et al. | 252/301.4 P |
| 5,340,556 | 8/1994 | Collin et al. | 252/301.4 P |

FOREIGN PATENT DOCUMENTS

| | | |
|---|---|---|
| 0498689 | 8/1992 | European Pat. Off. . |
| 2672281 | 8/1992 | France . |

OTHER PUBLICATIONS

Derwent Abstracts, Abstract of JP-92-196924, "Rare Earth Metal Phosphate(s) Manufactured for Fluorescent Lamps by Spray Drying Metal Phosphate Slurry Containing Activator to Form Green Spheres", May 1, 1992.
Patent Abstracts of Japan, Abstract of JP-4,130,014, "Production of Rare Earth Phosphate", May 1, 1992.

*Primary Examiner*—Wayne Langel
*Attorney, Agent, or Firm*—Wenderoth, Lind & Ponack

[57] ABSTRACT

A precipitation method is proposed for the preparation of a rare earth phosphate powder by the reaction of a water-soluble salt of the rare earth element in an aqueous solution with an ammonium phosphate, which gives a rare earth phosphate powder consisting of non-agglomerate discrete particles having a spherical particle configuration suitable as a base material of rare earth-based phosphors. The method is characterized by the addition of the ammonium phosphate in the form of a powder to an acidic aqueous solution of the rare earth salt under specified conditions in contrast to the conventional method in which the ammonium phosphate is admixed in the form of an aqueous solution.

7 Claims, No Drawings

METHOD FOR THE PREPARATION OF SPHERICAL PARTICLES OF A RARE EARTH PHOSPHATE

BACKGROUND OF THE INVENTION

The present invention relates to a method for the preparation of spherical particles of a rare earth phosphate or, more particularly, to a method for the preparation of a rare earth phosphate powder having a spherical particle configuration capable of giving an advantage of removing the difficulty encountered in the recovery of the precipitates of the phosphate from the precipitation medium by filtration and suitable as a base material of a rare earth phosphate-based phosphor useful mainly as a green-emitting phosphor in fluorescent lamps.

As is well known, cerium orthophosphate activated with terbium is a green-emitting phosphor and proposals have been made in Japanese Patent Kokai No. 60-10065 and No. 59-179578 and Japanese Patent Publication No. 1-41673 for a green-emitting rare earth phosphate-based phosphor containing one or more of the rare earth elements selected from yttrium, lanthanum and gadolinium in addition to cerium and terbium. It is generally accepted that the light-emitting efficiency of a rare earth-based phosphor is high when the particle configuration of the phosphor particles are as close to spherical as possible so that various proposals have been made heretofore in order to obtain spherical particles of a phosphor powder. For example, Japanese Patent Kokai No. 4-130014 pro- poses a method in which a powder of a rare earth phosphate as a base material of a rare earth-based phosphor is slurried in a suitable dispersion medium and the slurry is spray-dried by using a spray drier. This spray-drying method, however, is defective because the spherical particle obtained by this method is an agglomerate of a large number of fine primary particles so that the mechanical strength of such an agglomerate particle cannot be high enough to be readily disintegrated into the original fine particles resulting in poor workability in processing into a phosphor and decrease in the yield of the phosphor therefrom.

Apart from the problem of the light-emitting efficiency of the rare earth phosphate-based phosphor, one of the serious problems in the preparation of a rare earth phosphate powder by the method of precipitation is that the recovery of the phosphate precipitates from the precipitation medium by filtration is a very time-consuming process. Accordingly, it is eagerly desired to improve the filtrability of precipitates of a rare earth phosphate in order to increase the productivity of the process.

SUMMARY OF THE INVENTION

The present invention accordingly has an object to provide a rare earth phosphate powder of which the particles have a substantially spherical particle configuration or, in particular, a composite rare earth phosphate powder suitable as a base material of a rare earth-based phosphor with a substantially spherical particle configuration along with an advantage of high filtrability of the precipitates of the phosphate as well as to provide a method for such a rare earth phosphate powder without the problems in the above mentioned prior art methods.

Thus, the rare earth phosphate powder provided by the invention consists of particles of a substantially spherical particle configuration having a particle diameter in the range from 0.01 to 1 $\mu$m and such a rare earth phosphate powder is prepared by the method which comprises admixture of an aqueous solution of a water-soluble salt of a rare earth element having a pH value in the range from 1 to 7 or, preferably, in the range from 3 to 6 and kept at a temperature in the range from 40° to 100° C. or, preferably, from 65° to 95° C. with an ammonium phosphate in a powdery form.

DETAILED DESCRIPTION OF THE PREFERRED EMBODIMENTS

In contrast to the conventional precipitation method for the preparation of a rare earth phosphate powder in which an aqueous solution of a water-soluble salt of a rare earth element is admixed with an aqueous solution of a water-soluble phosphate such as ammonium phosphate, the present invention proposes a method for the preparation of a rare earth phosphate powder in which an aqueous solution of a water-soluble salt of a rare earth element is admixed with a powder of an ammonium phosphate under specified conditions to effect precipitation of the rare earth phosphate of which the particles have a substantially spherical particle configuration even without agglomeration of fine primary particles.

One of the starting materials in the inventive method is an aqueous solution of a water-soluble salt of a rare earth element. The method of the invention is applicable to any of the rare earth elements including yttrium and the elements having an atomic number of 57 to 71 inclusive either singly or as a combination of two kinds or more according to need such as a combination of lanthanum, cerium and terbium to form a composite phosphate powder of these rare earth elements which is useful as a base material of a green-emitting rare earth-based phosphor in fluorescent lamps. If adequate, it is sometimes a convenient or economical way to use the acidic aqueous solution of the rare earth elements obtained in the separation process of the rare earth elements by the method of solvent extraction although the most orthodox way for the preparation of an acidic aqueous solution of a water-soluble rare earth salt is to dissolve an oxide of the rare earth element in an inorganic acid such as hydrochloric acid, nitric acid and the like. The concentration of the rare earth element or the total concentration of the rare earth elements in the aqueous solution should be in the range from 0.01 mole/liter to 1 mole/liter or, preferably, from 0.05 mole/liter to 0.5 mole/liter. When the concentration of the rare earth element or elements in the aqueous solution is too low, the rare earth phosphate powder obtained therefrom may contain a substantial amount of too fine particles having a particle diameter smaller than 0.01 $\mu$m in addition to the decrease in the productivity of the process while, when the concentration is too high, the content of the precipitates of the rare earth phosphate formed in the aqueous medium is so large that the aqueous slurry of the precipitates may have a gel-like consistency to cause a difficulty in agitation. The aqueous solution of the rare earth salt should be acidic having a pH in the range from 1 to 7 or, preferably, in the range from 3 to 6. When the pH of the starting aqueous solution is too low or, namely, the solution is too strongly acidic, the precipitation reaction to form the precipitates of the rare earth phosphate would be incomplete resulting in a disadvantageous decrease in the yield of the desired rare earth phosphate product while, when the pH of the starting aqueous solution is too high, a part of the rare earth element may be precipitated not as the phosphate but as the hydroxide of the rare earth element. It is noted that, when the ammonium phosphate added to the starting aqueous solution of the rare earth element is an ammonium hydrogen phosphate, the pH of the aqueous medium is decreased as the precipitation reaction proceeds because a free acid, e.g., nitric acid, is produced by the reaction of the ammonium hydrogen phosphate with the rare earth salt, e.g., nitrate. It is important that the starting aqueous solution of the rare earth element is heated and kept, prior to the addition of the ammonium phosphate powder, at a temperature in the range from 40° to 100° C. or, preferably, in the range from 65° to 95° C. When the temperature of the starting aqueous solution of the rare earth salt is too low at the admixture of the ammonium phosphate, the precipitates of the rare earth phosphate would include too fine particles while the temperature should not be too high because violent evaporation of water from the solution or eventual boiling thereof is caused to decrease the working efficiency.

The thus prepared aqueous solution of the rare earth salt is then admixed with a powder of an ammonium phosphate. The ammonium phosphate usable here includes ammonium orthophosphate in the form of a hydrated salt with water of crystallization expressed by the formula $(NH_4)_3PO_4.3H_2O$, diammonium hydrogen phosphate of the formula $(NH_4)_2HPO_4$ and ammonium dihydrogen phosphate of the formula $NH_4H_2PO_4$. It is essential that these ammonium phosphates are added to the aqueous solution of the rare earth salt in the form of a powder and not in the form of an aqueous solution. It is desirable that the precipitation reaction to form the rare earth phosphate is completed within a time as short as possible so as to minimize intermixing of too fine particles in the precipitates of the rare earth phosphate. In this regard, the ammonium phosphate powder is added as quickly as possible to the aqueous solution of the rare earth salt under vigorous agitation. Further, it is desirable that the ammonium phosphate powder has a relatively small average particle diameter in order to complete the precipitation reaction within a short time although the average particle diameter of the ammonium phosphate powder should be in the range from 0.1 to 10 mm because the working efficiency would be decreased with an ammonium phosphate powder when the particle size thereof is too fine while the particle diameter should not be too large in view of a possible delay of completion of the precipitation reaction of the rare earth phosphate.

Upon completion of the precipitation reaction of the rare earth phosphate, it is preferable that the slurried reaction mixture is neutralized approximately to neutrality by the addition of ammonia water or other aqueous alkaline solution. This is particularly so when the ammonium phosphate used as the precipitant is an acidic ammonium phosphate, i.e. diammonium hydrogen phosphate or ammonium dihydrogen phosphate, because, as is mentioned before, a free acid is produced by the reaction of the rare earth salt and the acidic ammonium phosphate.

The thus obtained slurried reaction mixture after neutralization is filtered to collect the precipitates followed by washing with water and drying thereof to give a powder of the rare earth phosphate with water of crystallization as expressed by the formula $LnPO_4.xH_2O$, in which Ln is the rare earth element and x is a positive number, consisting of particles having a substantially spherical particle configuration. It is noteworthy that the filtration work of the precipitates-containing slurried reaction mixture can be completed very rapidly as compared with the slurry obtained by a conventional method. This is presumably due to the difference in the configuration of the phosphate particles, which, on one hand, is very irregular or needle-like in the conventional method and, on the other, spherical in the inventive method.

In the following, the method of the present invention is illustrated in more detail by way of examples and comparative examples, which, however, never limit the scope of the invention in any way.

EXAMPLE 1

An aqueous solution of nitrates of lanthanum, cerium and terbium was prepared in a molar ratio of La:Ce:Tb=5:4:1. The total concentration of the rare earth elements in the solution was 0.01 mole/liter and the pH of the solution was adjusted to 3.0 with nitric acid. Under vigorous agitation, a 500 ml portion of the aqueous solution kept at 80° C. was admixed with 0.99 g of diammonium hydrogen phosphate powder having an average particle diameter of 0.5 mm at one time. The amount of the diammonium hydrogen phosphate corresponds to 1.5 times of the stoichiometrically equivalent amount relative to the rare earth elements. Agitation was continued for 60 minutes at 80° C. to effect aging of the precipitates. The thus obtained reaction mixture having a pH of 0.95 was neutralized by the addition of ammonia water to have a pH of 8.10 and then filtered to collect the precipitates of the composite rare earth phosphate which was washed with water and dried. The filtration work could be completed very efficiently. The thus obtained rare earth phosphate powder was examined with a scanning electron microscope to find that each of the particles was not an agglomerate of fine primary particles.

EXAMPLE 2

The experimental procedure was substantially the same as in Example 1 except that the total concentration of the rare earth nitrates in the starting aqueous solution was 0.4 mole/liter instead of 0.01 mole/liter and the amount of the diammonium hydrogen phosphate powder added to the solution was increased to 39.6 g. The efficiency of the filtration work of the slurried reaction mixture was as good as in Example 1. The particles of the thus obtained composite rare earth phosphate powder had a particle configuration similar to that of the powder obtained in Example 1.

EXAMPLE 3

The experimental procedure was substantially the same as in Example 1 except that the total concentration of the rare earth nitrates in the starting aqueous solution was 0.2 mole/liter instead of 0.01 mole/liter, the amount of the diammonium hydrogen phosphate powder added to the solution was increased to 19.8 g and the reaction mixture was kept at a temperature of 50° C. instead of 80° C. The efficiency of the filtration work of the slurried reaction mixture was as good as in Example 1. The particles of the thus obtained composite rare earth phosphate powder had a particle configuration similar to that of the powder obtained in Example 1.

EXAMPLE 4

The experimental procedure was substantially the same as in Example 1 except that 0.99 g of the amount of the diammonium hydrogen phosphate powder added to the aqueous nitrate solution was replaced with 0.86 g of ammonium dihydrogen phosphate powder having an average particle diameter of 0.5 ram. The particles of the thus obtained composite rare earth phosphate powder had a particle configuration similar to that of the powder obtained in Example 1.

EXAMPLE 5

An aqueous solution of gadolinium nitrate was prepared in a concentration of 0.3 mole/liter. The pH of the solution was adjusted to 3.0 with nitric acid. Under vigorous agitation, a 500 ml portion of the aqueous solution kept at 70° C. was admixed with 23.8 g of ammonium dihydrogen phosphate powder having an average particle diameter of 0.5 mm at one time. The amount of the ammonium dihydrogen phosphate corresponds to 1.2 times of the stoichiometric amount relative to the rare earth element. Agitation was continued for 60 minutes at 70° C. to effect aging of the precipitates. The thus obtained reaction mixture having a pH of 0.88 was neutralized by the addition of ammonia water to have a pH of 8.05 and then filtered to collect the precipitates of the gadolinium phosphate powder which was washed with water and dried. The particles of the thus obtained gadolinium phosphate powder had a particle configuration similar to that of the powder obtained in Example 1.

EXAMPLE 6

The experimental procedure was substantially the same as in Example 5 except that the gadolinium nitrate was replaced with the same molar amount of ytterbium nitrate. The particles of the thus obtained ytterbium phosphate powder had a particle configuration similar to that of the powder obtained in Example 1.

Comparative Example 1

The experimental procedure was substantially the same as in Example 1 except that the temperature of the reaction mixture was kept at 20° C. throughout instead of 80° C. including the steps of precipitate formation and aging of the precipitates. Difficulties were encountered in the filtration work of the slurried reaction mixture to collect the precipitates due to clogging of the filter paper. The particles of the thus obtained composite rare earth phosphate powder were examined with a scanning electron microscope to find that the particles had a very irregular particle configuration.

Comparative Example 2

An aqueous solution of nitrates of lanthanum, cerium and terbium was prepared in a molar ratio of La:Ce:Tb=5:4:1. The total concentration of the rare earth elements was 0.2 mole/liter and the pH of the solution was adjusted to 3.0 with nitric acid. Under vigorous agitation, a 250 ml portion of the aqueous nitrate solution kept at 80° C. was admixed at one time with 250 ml of a 0.3 mole/ liter aqueous solution of diammonium hydrogen phosphate heated at 80° C. The amount of the diammonium hydrogen phosphate corresponds to 1.5 times of the stoichiometric amount relative to the rare earth elements. Agitation was continued for 60 minutes at 80° C. to effect aging of the precipitates. The thus obtained reaction mixture having a pH of 0.76 was neutralized by the addition of ammonia water to have a pH of 8.03 and then filtered to collect the precipitates of the composite rare earth phosphate powder which was washed with water and dried. The thus obtained composite rare earth phosphate powder was examined with a scanning electron microscope to find that the particles were each an agglomerate of fine primary particles.

Comparative Example 3

A composite rare earth oxide powder of lanthanum, cerium and terbium was prepared in the following manner. Thus, 500 ml of an aqueous solution of nitrates of these rare earth elements in a total concentration of 0.1 mole/liter, of which the molar proportion of La:Ce:Tb was 5:4:1, was admixed with an aqueous solution prepared by dissolving 14.2 g of oxalic acid dihydrate in 300 ml of a 0.2N ammonia water under agitation to precipitate a composite rare earth oxalate which was collected by filtration, washed with water, dried and calcined at 1000° C. to give a composite rare earth oxide.

A powder mixture consisting of 7 g of the thus prepared composite rare earth oxide and 6.5 g of diammonium hydrogen phosphate was heated at 950° C. for 3 hours in an alumina crucible to effect the reaction of the mixture into a composite rare earth phosphate. The thus obtained phosphate-powder was examined with a scanning electron microscope and found to consist of irregular agglomerates of fine primary particles.

Comparative Example 4

The experimental procedure was substantially the same as in Comparative Example 3 except that the composite rare earth oxalate as the precursor of the composite rare earth oxide was prepared by the admixture of 500 ml of the mixed rare earth nitrate solution of lanthanum, cerium and terbium having a pH of 1.5 adjusted by the addition of ammonia water with an aqueous oxalic acid solution prepared by dissolving 14.2 g of oxalic acid dihydrate in 300 ml of water. The particle configuration of the thus obtained composite rare earth phosphate particles was similar to that obtained in Comparative Example 3.

What is claimed is:

1. A method for the preparation of a rare earth phosphate powder which comprises the step of:
   admixing an aqueous solution of a water-soluble salt of a rare earth element having a pH value in the range from 1 to 7 and kept at a temperature in the range from 40° to 100 ° C. with an ammonium phosphate in a powdery form to precipitate phosphate of the rare earth element.

2. The method for the preparation of a rare earth phosphate powder as claimed in claim 1 in which the concentration of the salt of the rare earth element in the aqueous solution is in the range from 0.01 mole/liter to 1 mole/liter.

3. The method for the preparation of a rare earth phosphate powder as claimed in claim 1 in which the ammonium phosphate is diammonium hydrogen phosphate or ammonium dihydrogen phosphate.

4. The method for the preparation of a rare earth phosphate powder as claimed in claim 1 in which the powder of the ammonium phosphate has a particle diameter in the range from 0.1 mm to 10 mm.

5. The method for the preparation of a rare earth phosphate powder as claimed in claim 1 in which the pH of the aqueous solution of the rare earth salt is in the range from 3 to 6.

6. The method for the preparation of a rare earth phosphate powder as claimed in claim 1 in which the temperature of the aqueous solution of the rare earth salt is in the range from 65° to 95° C.

7. The method for the preparation of a rare earth phosphate powder as claimed in claim 1 in which the amount of the powder of the ammonium phosphate is in the range from 1 to 2 times of the stoichiometrically equivalent amount relative to the rare earth element.

* * * * *